United States Patent [19]  [11] 4,133,363
Gardner  [45] Jan. 9, 1979

[54] DEVICE FOR MOUNTING/DEMOUNTING TIRES ON CUSTOM AUTOMOBILE WHEELS

[76] Inventor: Larry D. Gardner, Rte. 2 Box 2680A, Grandview, Wash. 98930

[21] Appl. No.: 772,065

[22] Filed: Feb. 25, 1977

[51] Int. Cl.² ............................................. B60C 25/04
[52] U.S. Cl. .................................. 157/1.3; 144/288 A
[58] Field of Search .............. 144/288 A; 157/1, 1.22, 157/1.24, 1.3

[56]  References Cited
  U.S. PATENT DOCUMENTS

| 1,234,141 | 7/1917 | DeVine | 157/1.22 |
|---|---|---|---|
| 1,320,829 | 11/1919 | Bohne | 157/1.22 |
| 2,213,535 | 9/1940 | Seip | 144/288 A |
| 2,609,039 | 9/1952 | Henderson | 157/1.24 |
| 3,211,206 | 10/1965 | Garthe | 157/1.24 |
| 3,918,509 | 11/1975 | Trotter | 157/1.22 X |

*Primary Examiner*—Al Lawrence Smith
*Assistant Examiner*—James G. Smith
*Attorney, Agent, or Firm*—Cole, Jensen & Puntigam

[57] ABSTRACT

Articles of manufacture useful in mounting/demounting tires on custom automobile wheels made from magnesium, aluminum and other similar metals or alloys thereof. One article is a wheel hub interface element, a first portion of which is configured to fit over and around a portion of the hub of a custom wheel and a second portion of which is configured to receive the mounting cone of a conventional tire changer apparatus. The interface element permits the wheel to be secured in position in a conventional tire changer for tire mounting/demounting, without damage to the wheel hub. The other article is an improved combination tool for mounting/demounting tires on custom wheels, specifically, seating/breaking a tire bead on/from the wheel rim. The tool includes a base portion, a mounting portion and a demounting portion. The base portion receives a combination tool handle. The demounting portion extends away from the base portion, and is relatively flat and thin with a knob-like element extending across its free end. The mounting portion extends away from the base portion but is curved relative to the base in a generally U-shape, configured to fit around a portion of the wheel rim. The combination tool is made from a material which is sufficiently rigid to withstand the pressure applied to it during tire-changing operations, yet is not abrasive, and hence does not cause cosmetic damage to the custom wheel.

9 Claims, 9 Drawing Figures

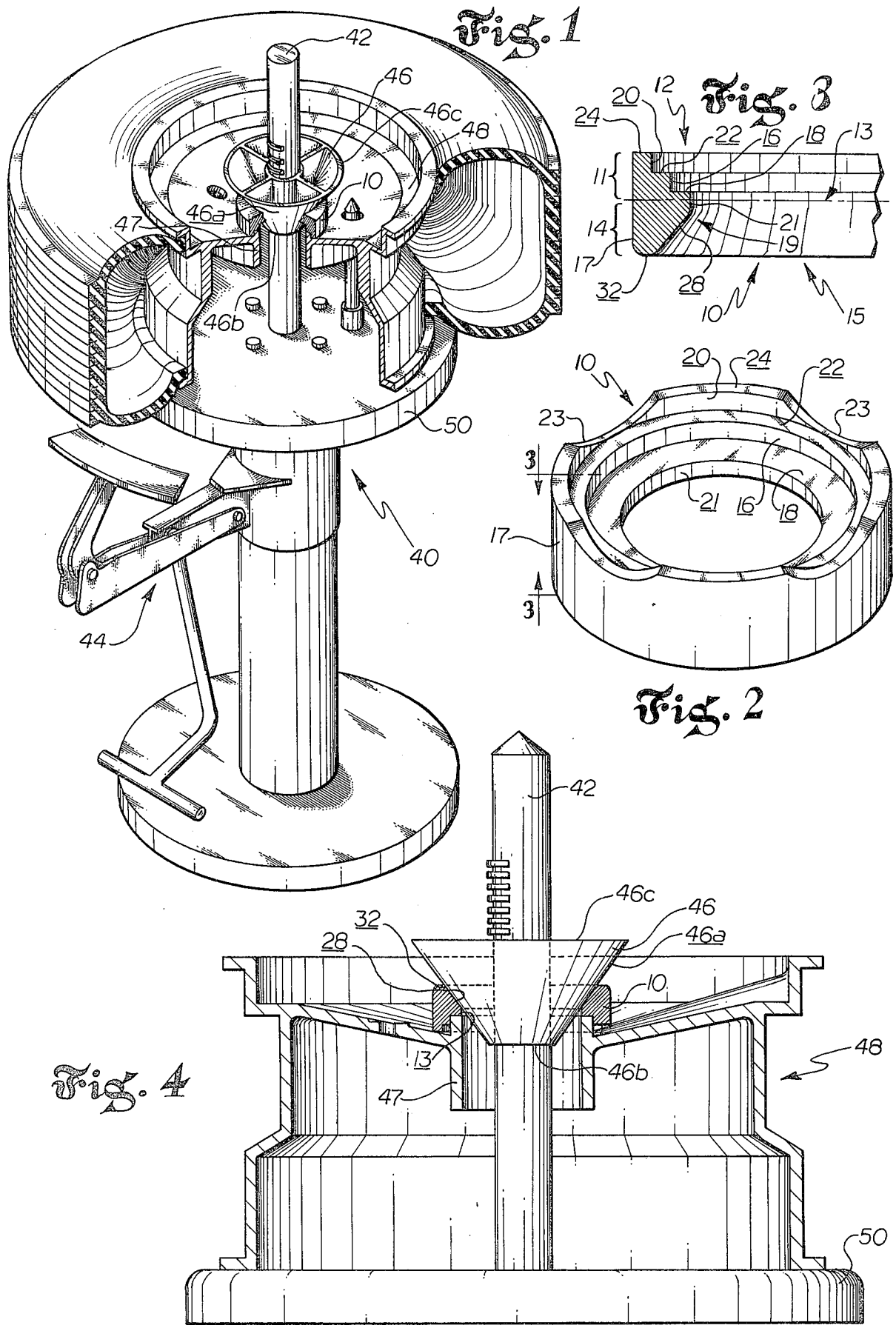

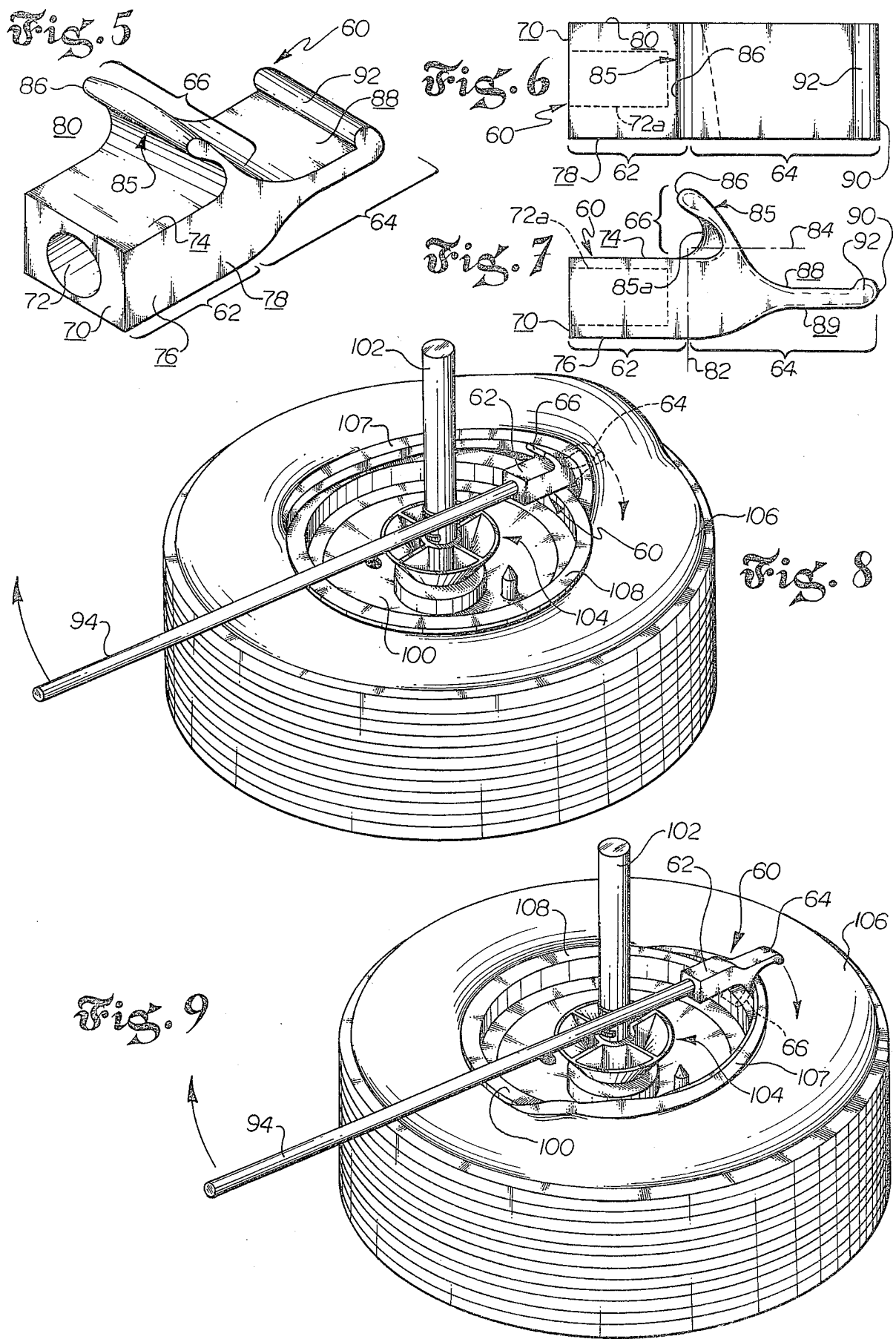

DEVICE FOR MOUNTING/DEMOUNTING TIRES ON CUSTOM AUTOMOBILE WHEELS

BACKGROUND OF THE INVENTION

This invention relates generally to the art of mounting/demounting automobile tires, and more particularly concerns devices which are useful in mounting/demounting tires on custom automobile wheels comprised of aluminum, magnesium and/or other similar metals or alloys thereof, which are easily damaged in normal tire changing operations by conventional tire changers and tire mounting/demounting devices.

Conventional automobile wheels are made from steel, which is a very hard and strong metal. Mechanical tire changers, both manual and power operated, have been developed for conventional steel wheels, and are widely used in the industry. Over the past several years, however, other metals besides steel have been used for wheels, particularly for custom automobile wheels, including aluminum, magnesium and various alloys thereof. Such custom wheels have become increasingly popular, and they are now available in a wide variety of designs. Most of the custom wheels comprise a raised central hub and four or five spokes joining the central hub to the wheel rim, although some wheels feature a central hub with a substantially solid wall joining the hub to the rim, while still others have various ribbed configurations which simulate wire wheels.

The metals used in these custom wheels, and particularly that used for the wheel hub, however, are a source of significant problems, because of their relative softness, when tires are mounted/demounted on the wheels. The rims of the custom wheels are easily scratched, marred, or otherwise damaged during mounting/demounting operations, while the wheel hub, particularly when raised, is susceptible to breakage from the action of the mounting cone, a device used by virtually all mechanical tire changers. Cosmetic damage, of course, harms the appearance of the wheel, but a broken hub requires that the wheel be replaced.

Since custom wheels are quite expensive, and since the chance of damage both to the appearance and structure of such wheels in tire-changing operations is quite high, even with considerable care on the part of the operator, most service stations, and even some tire dealers, refuse to mount/demount tires on custom wheels, or only do so on the basis of a disclaimer. Others, particularly sellers of custom wheels, have accepted the likelihood of damage and resulting loss as an inevitable cost of doing business.

Both the damage to the appearance (scratching etc.) and structure (breakage of hub) of the wheels is due, as stated above, to the relative softness of the metal used in making the custom wheels, and to the fact that the central hubs of such wheels are usually raised from that portion of the wheel connecting the hub with the rim. Conventional tire changers and the tools used therewith are made to be used with the hard steel wheels, and hence cause both appearance and structural damage to the much softer custom wheels. It is not economical, however, to design special purpose tire changers to accommodate custom wheels.

Accordingly, it is a general object of the present invention to overcome the disadvantages of the prior art noted above.

It is an object of the present invention to provide tire mounting/demounting devices which are particularly adapted for changing tires on custom automobile wheels comprising metals which are more susceptible to appearance and structural damage than conventional steel wheels.

It is another object of the present invention to provide such devices which eliminate or significantly reduce the chances of damage to the appearance of such custom wheels during tire-changing operations.

It is a further object of the present invention to provide such devices which eliminate or significantly reduce the chances of structural damage to the central hub of such custom wheels during tire-changing operations.

It is an additional object of the present invention to provide such devices which are relatively inexpensive, and which may be conveniently used by unskilled personnel.

It is a still further object of the present invention to provide such devices which are useful with existing tire changing apparatus.

It is yet another object of the present invention to provide such devices which can be used without marring or scratching the wheels.

It is an additional object of the present invention to provide such devices which may be used with wheels having different sized hubs.

SUMMARY OF THE INVENTION

One article of manufacture is useful with a tire-changing apparatus which includes a hold-down cone or similar device in tire-changing operations on wheels having central hubs which are susceptible to breakage from force produced when the hold-down cone is operatively positioned and clamped during tire-changing operations. The article is an interface element having a first portion which is configured and arranged to fit securely over and around a portion of the central hub of the wheel when the wheel is operatively positioned on the tire-changing apparatus, and a second portion which is so configured and arranged as to receive the hold-down cone in a manner which permits the wheel to be securely clamped in the tire changing apparatus so that a tire-changing operation may be accomplished. The interface element is comprised of such a material and said first and second portions are further in combination so configured and arranged that substantially and force produced when the hold-down cone is operatively positioned and clamped which would otherwise result in breakage of the central hub is prevented from reaching the central hub.

Another article of manufacture is an improved version of a device referred to in the tire-changing art as a combination tool. The improved combination tool is useful for seating and/or breaking the bead of a tire relative to a wheel rim. The article includes a combination tool head which is adapted to be used with an integral or separately provided handle. The tool head comprises a first portion which is configured and adapted to function as a base for the tool head, a second portion configured and adapted to function as a tire bead breaker, and a third portion configured and adapted to function as a tire bead seater. In more detail, the second portion projects away from the first portion and includes a free lateral end. The second portion is substantially flat and relatively thin, so that it may be conveniently inserted between the tire bead and the wheel rim. The second portion further includes a knob-like element which extends across the free end of the second portion and further extends somewhat above the remainder of the second portion. In use, the second portion is inserted between the tire bead and the edge of the wheel rim, and causes the tire bead to be pushed up and off the wheel rim when the combination tool is laid flat against the wheel and then rotated about a center post or the like which extends through the center of the wheel. The knob-like element acts as a stop to prevent the tire bead from slipping off the second portion. The third portion projects away from the first portion in a slight curve, and is relatively thin so that it may be conveniently inserted between the tire bead and the wheel rim. The first and third portions are oriented relative to each other such as to form an open-sided pocket which is configured to receive a portion of the wheel rim. In use, the third portion is insertable between the tire bead and the wheel rim and causes the tire bead to be pushed up and onto the wheel rim when the combination tool is positioned and rotated in the manner explained above relative to bead breaking.

DESCRIPTION OF THE DRAWINGS

FIG. 1 is an isometric view of the interface element of the present invention operatively positioned in combination with a manual tire changer set up for a tire changing operation.

FIG. 2 is an isometric view of the interface element of the present invention shown in FIG. 1.

FIG. 3 is a partial cross-sectional view of the interface element taken along lines 3—3 of FIG. 2.

FIG. 4 is a section view of the tire changer of FIG. 1, showing the relationship of the interface element, the hold-down cone of the tire changer, and a custom wheel.

FIG. 5 is an isometric view of the combination tool head of the present invention.

FIG. 6 is a top view of the article of FIG. 5.

FIG. 7 is a side elevational view of the article of FIG. 5.

FIG. 8 is an isometric view showing the manner in which the combination tool of FIGS. 5-7 is used to remove (break) a tire bead from a wheel rim.

FIG. 9 is an isometric view showing the manner in which the combination tool of FIGS. 5-7 is used to seat the tire bead on a wheel rim.

DESCRIPTION OF THE PREFERRED EMBODIMENT

Referring to FIGS. 2 and 3, a wheel hub interface element 10 for use with tire changers, both manual and power, is shown. Interface element 10 resembles a donut or collar in general configuration, and includes first and second portions 11 and 14.

First portion 11 extends from one end 12 to approximately a center line 13 of interface element 10 and is adapted to fit over and around a portion of the raised central hub of custom wheels. The second portion 14 extends from the other end 15 to central line 13 of interface element 10 and is adapted to receive the standard hold-down cone used in tire changers.

Interface element 10 has an outside wall 17 of uniform diameter and an inside wall 19 of varying diameter. Approximately midway between ends 12 and 15 is central line 13, at which point, the interior diameter of interface element 10 is at a minimum. The opening through interface element 10 at central line 13 is substantially circular, is defined by a first vertical section 21 of inside wall 19, and is sufficiently large to permit the center post of a tire changer to fit therethrough.

In the embodiment shown, interface element 10 has an exterior diameter of approximately 3 9/16 inches, and an interior diameter at first vertical surface 21 of approximately 2⅛ inches. The interior diameter of interface element 10 increases in several steps from central line 13 to the one end 12. From central line 13, inside wall 19, at first vertical surface 21, rises approximately ⅛th of an inch, at which point inside wall 19 steps radially outwardly, with the interior diameter of interface element 10 increasing to approximately 2¾ inches at second vertical surface 16. Second vertical surface 16 is also cylindrical and the interior diameter of interface element 10 is sufficiently large at that point that it can be fitted over and around a portion of the hubs of 14 inch wheels. First horizontal surface 18 of inside wall 19 connects first vertical surface 13 with second vertical surface 16. First horizontal surface 18 is flat, so that it rests upon a portion of the automobile hub when interface element 10 is operatively positioned.

Second vertical surface 16 extends upwardly toward the one end 12 approximately ¼ inch, at which point inside wall 19 again steps radially outwardly, with the interior diameter of interface element 10 increasing to 3¼ inches, at third vertical surface 20. Third vertical surface 20 is also cylindrical, and the interior diameter of interface element 10 is sufficiently large at that point that it can be fitted over and around a portion of the hubs of 15 inch wheels. Connecting second vertical surface 16 with third vertical surface 20 is a flat second horizontal surface 22.

Third vertical surface 20 extends upwardly from second horizontal surface 22 approximately ¼ inch, terminating at the one end 12 in third horizontal surface 24, which connects third vertical surface 20 and outside wall 17.

Third vertical surface 20, third horizontal surface 24, and the upper portion of outside wall 17 forms a circumferential edge for interface element 10, in which are located four or more arcuate shaped cutout portions 23—23, which are shown most clearly in FIG. 2. Arcuate cutouts 23—23 may terminate close to or at second horizontal surface 22. They are evenly spaced around the circumferential edge of interface element 10, and are configured so as to mate with a portion of the spokes of 13 inch wheels which extend from the wheel hub to the wheel rim. Presently, the hubs of 14 and 15 inch wheels are sufficiently raised that spoke clearance is not a problem. Hence, arcuate cutouts 23—23 are present in interface element 10 to accommodate spoked 13 inch wheels. Arcuate cutouts 23—23 permits interface element 10 to be set down securely on the central hub of 13 inch wheels. FIG. 2 shows 4 arcuate cutouts in interface element 10. Hence the interface element of FIG. 2 will fit 4 spoke wheels. A different configuration of arcuate cutouts will be necessary, of course, for wheels having greater or fewer spokes.

The second portion of interface element 10 extends approximately from central line 13 to the other end 15, with inside wall 19 increasing in diameter to accommodate a hold-down cone in a manner necessary to accomplish normal tire-changing operations. From central line 13, first vertical wall 21 descends approximately ⅛ inch where it intersects an inclined surface 28, which is reversely inclined in the direction of the other end 15, i.e., the interior diameter of interface element 10 increases from 2⅛ inches to 3¼ inches from its beginning in the vicinity of central line 13 to its termination at the other end 15.

Inclined surface 28 in the embodiment shown is approximately 55° from the vertical and defines a conical opening so as to receive the hold-down cone. Inclined surface 28 terminates at a fourth horizontal surface 32, which is generally flat, and connects inclined surface 28 with outside wall 17. The intersection of first vertical surface 21 and inclined surface 28, the intersection of inclined surface 28 and fourth horizontal surface 32, and the intersection of fourth horizontal surface 32 and outside wall 17 are all rounded in the embodiment shown to increase the durability of element 10 and prevent any possible injury to the users of the device.

FIGS. 1 and 4 show interface element 10 in use with a manual tire changer, shown generally at 40. It should be understood, of course, that the tire changer shown in FIGS. 1 and 4 is for purposes of illustration only, and that interface element 10 can be conveniently used with other tire changers, including power tire changers.

The tire changer 40 of FIG. 1 includes a center post 42, around which a wheel 48 is positioned, a platform 50 on which wheel 48 is resting, a tire bead breaker 44, and a wheel hold-down cone 46. A plastic or foam pad (not shown) could be used as well on platform 50 to aid in prevention of cosmetic damage to wheel 48.

In operation of tire changer 40, custom wheel 48 is positioned so that it rests on platform 50, with central post 42 extending upwardly through the opening in the wheel defined by the central hub. Interface element 10 is then positioned over center post 42 and down against wheel hub 47 in a manner so that one of the horizontal surfaces 18 or 22 of first portion 11 of interface element 10 rests on a corresponding horizontal surface of wheel hub 47, and so that either vertical surface 16 or 20 fits against the vertical surface of hub 47.

Which vertical and horizontal surfaces of first portion 11 are used will depend upon the size of the wheel hub. Generally, wheel hubs come in 13, 14 and 15 inch sizes, and the interface element of FIGS. 2 and 3 is structured to accommodate all of these sizes, and others as well, so that it is a universal element for custom wheels.

With interface element 10 positioned as described above, over and around a portion of the central hub 47 of wheel 48, the second portion 14 of interface element 10 is exposed. The wheel hold-down cone 46 is then slipped over center post 42 and down into the central conical opening of interface element 10 defined by inclined surface 28, such that the conical surface 46a of hold-down cone 46 fits snuggly against inclined surface 28 of interface element 10, as shown most clearly in FIG. 4.

When hold-down cone 46 is correctly positioned, the small end 46b of hold-down cone 46 extends some distance below the one end 12 of interface element 10, while the large end 46c of hold-down cone 46 will still extend above end 15 of interface element 10.

Hold-down cone 46 is then clamped into place on center post 42 by conventional means. Tire changer 40 is then ready for commencement of normal tire-changing operations. In operation, interface element 10 takes up the horizontal or radial force produced when hold-down cone 46 is operatively positioned to clamp wheel 48 in place against platform 50.

Ordinarily, this radial force is exerted directly on the wheel hub, which results in breakage of those custom non-steel hubs which are raised from the remainder of the wheel. Interface element 10 takes up or absorbs this radial force, so that it is not transmitted to the hub. This eliminates the hub breakage problem now so common in the art. The vertical pressure or force normally exerted on the wheel when the hold-down cone is operatively clamped is transferred directly through interface element 10 against wheel 48, resulting in wheel 48 being clamped securely against platform 50, so that a normal tire-changing operation can be performed. Hence, interface element 10 eliminates the radial force but transmits the vertical force produced when hold-down cone 46 is operatively positioned, thereby eliminating the hub breakage problem without in any way interfering with the normal operation of the tire changer.

When the tire-changing operation is completed, hold-down cone 46 is released, and interface element 10 removed and saved for the next custom wheel mounting-/demounting operation.

Interface element 10 may be made from a variety of materials, including steel, but when interface element 10 is made from a non-marring material, such as styrene plastic, wheel hub 47 will escape any appearance damage which otherwise might be caused by careless or rough usage of a hard metal interface element.

The interface element 10 shown in FIGS. 2 and 3 may take configurations other than that specifically shown and described. Interface element 10 must, however, include one portion which is configured to fit over and around a portion of the central hub of a wheel, and another portion which is configured to accommodate the hold-down cone, or similar device, of conventional tire changers.

Interface element 10 must further have such a general configuration that, in use, the element transfers the vertical force produced by an operatively positioned and clamped hold-down cone, such that the wheel is clamped tightly against the supporting platform, but does not transfer to the central hub of the wheel any radial force produced by the same operatively positioned and clamped hold-down cone, because the radial force which is likely to result in cracking or breakage of otherwise unprotected raised hubs of custom wheels.

Referring now to FIGS. 5, 6 and 7, the head of a combination tool useful for mounting/demounting tires on automobile wheels is shown. The configuration of the combination tool head, as well as the material comprising it, are such as to prevent marring, scratching or other appearance damage to the wheel, particularly the exterior rim of the wheel during tire-changing operations. The combination tool head shown in FIGS. 5-7 is particularly adapted to be used on custom wheels made from magnesium, aluminum or similar alloys which are susceptible to appearance damage from conventional combination tools during tire-changing operations.

The combination tool head shown generally at 60 in FIGS. 5, 6 and 7 comprises three primary portions: a base portion 62, which is adapted to receive an elongated handle; a tire bead breaker portion 64, which extends directly rearwardly from base portion 62, is substantially flat and relatively thin with a small rounded knob along its free lateral edge and is adapted to remove the tire bead, which is the free edge of a tire, from the wheel rim; and a tire bead seater portion 66, which extends upwardly from base portion 62 and then somewhat forwardly in a slight curve, is relatively thin and adapted to fit around the edge of a wheel rim, and is adapted to insert or seat the tire bead onto a wheel rim.

Base portion 62 of combination tool head 60 is, in the embodiment shown, a substantially rectangular block of material, having a front surface 70 in which is located an opening 72 which extends rearwardly of base portion 62 to form a cavity 72a, which is sufficiently deep for secure attachment of a handle, by conventional means.

Tool head 60 includes top and bottom surfaces 74 and 76 and side surfaces 78 and 80 which extend the full length of toolhead 60. In base portion 62, top and bottom surfaces 74 and 76 are both substantially flat, are parallel with each other, and extend rearwardly of toolhead 60 from front surface 70 of base portion 62 approximately 2¼ inches. Top and bottom surfaces 74 and 76 are approximately 2 inches wide for the full length of toolhead 60. Connecting top and bottom surfaces 74 and 76 are side surfaces 78 and 80, which in the base portion 62 of the embodiment shown are approximately 1½ inches high. Side surfaces 78 and 80 are flat and parallel with each other the full length of toolhead 60.

For purposes of description of the embodiment shown, base portion 62 is defined to terminate at an imaginary vertical line 82 and an imaginary horizontal line 84 (FIG. 7). The boundaries between the various portions of toolhead 60 are actually somewhat arbitrary however, as toolhead 60 is made from a single block of material, and the three portions 62, 64 and 66 converge into each other.

Bead seater portion 66, defined by a lip surface 85, which is a portion of top surface 74, rises upwardly from the rear edge of base portion 62, from a base line shown as imaginary horizontal line 84, which intersects vertical line 82 at right angles and is essentially an imaginary extension of top surface 74 of base portion 62. Bead seater portion 66 extends from side 78 to side 80 and curves upwardly and slightly forwardly toward surface 70 in a relatively thin lip or protrusion which is approximately ⅜ inch thick at its base on horizontal line 84 and which tapers to approximately ⅛ inch at its free edge 86.

Bead seater portion 66 is further arranged so that the concave portion 85a of lip surface 85 between the flat portion of top surface 74 (in base portion 62) and free edge 86 is angled at approximately 2°–10° between sides 78 and 80, as most clearly shown in FIG. 6. Free edge 86, however, remains substantially perpendicular to sides 78 and 80. Furthermore, the side edges of bead seater portion 66 adjacent side 80 is tapered to a relatively sharp edge, compared to the opposite side edge. These features aid in seating the tire bead on the wheel rim, as will be explained more fully in following paragraphs.

At free edge 86, mounting portion 66 is approximately 1 inch above top surface 74. Since bead seater portion 66 rises concavely to free edge 86 from the rear edge of base portion 62, an open sided pocket is formed between bead seater portion 66 and base portion 62. This pocket is configured to receive the edge of the wheel rim during tire bead seating operations.

The portion of head 60 bounded by both horizontal line 84 and vertical line 82 is bead breaker portion 64. Bead breaker portion 64 is defined by the two sides 78 and 80, and surfaces 88 and 89, which are portions of top and bottom surfaces 74 and 76, respectively, and begin, respectively, at horizontal line 84 and vertical line 82.

Surface 88 curves concavely downwardly from horizontal line 84 until it becomes horizontal (FIG. 7) while surface 89 curves first slightly convexly up from line 82 and then concavely until it also becomes horizontal, at approximately the same longitudinal position where surface 88 becomes horizontal. At this point, bead breaker portion 64 is approximately ¼ inch thick. Surfaces 88 and 89 continue parallel to each other for approximately 1½ inches until bead breaker portion 64, and hence toolhead 60 as well, terminates in free end 90, resulting in an overall length for toolhead 60 of approximately 5 inches.

Located at free end 90 is a knob 92 which extends across the entire width of bead breaker portion 64. Knob 92 extends above surface 88 approximately 3/16 inch and is approximately ⅜ inch wide where it meets with surface 88. Knob 92 acts as a retard or stop at free end 90 of bead breaker portion 64. The operating significance of knob 92 will become clearer when the operation of the combination tool is explained in following paragraphs.

In the embodiment shown, toolhead 60 is made from a single block of styrene plastic, or similar material, which substantially reduces the chances of appearance damage to custom wheel rims during tire changing operations. The configuration of toolhead 60 also reduces the risk of such damage. Conventional combination tools, with conventional configurations, and comprised of hard metals such as steel, have in the past frequently been a cause of such appearance damage.

To complete the combination tool, an elongated handle configuration is inserted in cavity 72a in base portion 62 and firmly secured thereto. The combination tool is now ready to use. Although toolhead 60 is shown with a conventional manual handle 74, it should be understood that it can be adapted for use with other handle arrangements, particularly with powered apparatus. Also, the handle may be manufactured integral with toolhead 60.

FIGS. 8 and 9 show how the combination tool is used to mount/demount tires on custom wheels. In each figure, a wheel 100 with tire 106 is shown positioned around a centerpost 102 which forms part of a conventional tire changing apparatus (not shown). Wheel 100 is held down against a platform (not shown) by a conventional holddown cone 104. When a tire 106 is to be demounted from wheel 100, as shown in FIG. 8, tire 106 is first deflated. Bead breaker portion 64 of tool head 60 is then inserted between the bead 107 of tire 106 and edge 108 of the wheel rim, such that tire bead 107 is resting on surface 88 of bead breaker portion 64.

The combination tool is laid flat on wheel 100 and against centerpost 102, such that bottom surface 76 rests on edge 108 of the wheel rim, and then is rotated clockwise about centerpost 102, forcing or "breaking", the bead 107 of tire 106 up and over edge 108 of the wheel rim. Knob 92 prevents the tire bead from slipping off the toolhead, and hence, the entire bead may usually be broken in one continuous movement of the combination tool. Bottom surface 76 slides across edge 108 of the rim, but due its configuration and its material does not scratch or marr the rim in any way.

FIG. 9 shows how the combination tool is used to mount a tire on a wheel. With tire 106 deflated, a portion of tire bead 107 is inserted over edge 108 and onto the wheel rim. Just forward of this location, bead seater portion 66 is inserted between tire bead 107 and interior surface of edge 108 of the wheel rim. Top surface 74 now rests on edge 108, and bead breaker portion 64 extends radially outward from edge 108 over a portion of the exposed sidewall of tire 106. Bead seater portion 66 extends around edge 108 and lies substantially adjacent the interior surface of edge 108. Edge 108 thus fits into the open-sided pocket defined by base portion 62 and bead seater portion 66.

With the toolhead 60 so positioned, the bead seating operation can begin. The combination tool is laid flat against wheel 100, and against centerpost 102. The tool is then rotated clockwise about centerpost 102, forcing the tire bead up and over edge 108 and onto the wheel rim. Tire bead 107 is thereby seated onto the wheel rim. Usually, tire bead 107 can be seated in one continuous movement of the combination tool.

The angling of concave surface portion 85a from side 78 to side 80 aids in the seating of tire bead 107 by reducing the friction effect which otherwise might occur between the trailing edge of bead seater portion 66 and edge 108 of the wheel rim. Further, the leading edge of bead seater portion 66 is the sharper one, as described above, which further assists in the seating of tire bead 107.

Although a preferred embodiment of the invention has been disclosed for purposes of illustration, it should be understood that various changes, modifications and substitutions may be incorporated in such embodiment without departing from the spirit of the invention. For instance, modifications to the dimensions specified above for the interface element of FIGS. 1-4 and the toolhead of FIGS. 5-9 may be made within the spirit of the present invention. The invention is defined by the claims, which follow.

What is claimed is:

1. An article of manufacture useful with a handle provided integral therewith or separate therefrom as a combination tool for seating and breaking a tire bead relative to a wheel rim, comprising:

a tool head which comprises (1) a first portion configured and adapted to function as a tool head base and for receiving the handle, (2) a second portion configured and adapted to function as a tire bead breaker, said second portion projecting from said first portion and terminating in a free lateral end, said second portion being relatively thin, so that it may be conveniently inserted between the tire bead and the wheel rim, said second portion further including a knob-like element which extends across said free lateral end and somewhat above the remainder of said second portion, said second portion, in use as a tire bead breaker following insertion thereof between the tire bead and the wheel rim, causing the tire bead to be pushed up and off the wheel rim when the combination tool is rotated about the center of the wheel, said knob-like element acting as a stop to prevent the tire bead from slipping off said second portion, and (3) a third portion configured and adapted to function as a tire bead seater, said third portion projecting upwardly away from said first portion in a slight convex curve in a direction away from said free lateral end of said second portion, said third portion being relatively thin so that it may be conveniently inserted between the tire bead and the wheel rim, said first and third portions being oriented relative to each other such as to form an open-sided pocket configured to receive a portion of the wheel rim, said third portion, in use as a tire bead seater following insertion thereof between the tire bead and the wheel rim, causing the tire bead to be pushed up and onto the wheel rim when the combination tool is rotated about the center of the wheel, wherein said second portion extends over a portion of the side wall of the tire when the combination tool is used to seat a tire bead in such a manner that said knob-like element bears against the side wall of the tire, thereby assisting in the seating of the tire bead on the wheel rim.

2. An article of claim 1, wherein said combination toolhead is comprised of a material which is sufficiently rigid to break and/or seat tire beads and sufficiently non-abrasive that damage to the appearance of the wheel during tire-changing operations is prevented.

3. An article of claim 2, wherein a section of said third portion is slightly angled from one side of said tool to the other thereby slightly relieving said third portion to reduce the frictional contact between said toolhead and the wheel rim from said one side of said third portion to the other during seating of the tire bead.

4. An article of claim 3, wherein said second portion is substantially flat and projects substantially directly rearwardly of said first portion, and wherein said second and third portions both project from said first portion in the vicinity of the rear edge thereof.

5. An article of manufacture, for use with a tire-changing apparatus which makes use of a hold-down cone or the like and a clamping post therefore, for mounting tires on wheels which have raised central hubs, wherein the raised central hubs have interior, exterior and top surfaces and wherein the raised central hubs are susceptible to breakage when the hold-down cone is forced along the clamping post against a wheel hub during operative positioning of the wheel on the tire-changing apparatus, said article comprising:

an interface element having (1) a first portion which includes means for intimately engaging the exterior surface of the raised central hub of a wheel, and (2) a second portion which includes means for receiving the hold-down cone by engaging the exterior surface thereof, so that when the hold-down cone is forced along the clamping post against said receiving means, the wheel is securely clamped in the tire-changing apparatus, wherein said interface element is comprised of a sufficiently rigid material that substantially any radial force produced during the operative positioning of the hold-down cone on the clamping post for a tire-changing operation which would otherwise result in breakage of the wheel hub is prevented from reaching the wheel hub, thereby preventing breakage of the hub.

6. An article of claim 5, wherein said second portion of said interface element is so configured as to mate with the hold-down cone over a significant portion of the exterior surface thereof.

7. An article of claim 6, wherein said interface element is collar-like in general configuration and wherein said first portion extends from one end of said interface to substantially the midpoint thereof and wherein said second portion extends from the other end of said interface element to substantially the midpoint thereof.

8. An article of claim 7, wherein said first portion includes one step-like section and is otherwise so configured that said interface element mates with the exterior and top surfaces of the raised central hub but does not mate with the interior surface thereof.

9. An article of claim 8, wherein a plurality of generally arcuate-shaped cut-out portions are defined in the top surface of the first portion of said interface element, said cut-out portions being so configured and so spaced around the top surface as to accommodate raised portions of the wheel such as wheel spokes and the like.

* * * * *